United States Patent
Shalom et al.

(10) Patent No.: US 7,539,204 B2
(45) Date of Patent: May 26, 2009

(54) DATA AND CONTEXT MEMORY SHARING

(75) Inventors: Rafi Shalom, Ramat Gan (IL); Amit Oren, Caesarea (IL)

(73) Assignee: Broadcom Corporation, Irvine, CA (US)

( * ) Notice: Subject to any disclaimer, the term of this patent is extended or adjusted under 35 U.S.C. 154(b) by 1333 days.

(21) Appl. No.: 10/255,240

(22) Filed: Sep. 26, 2002

(65) Prior Publication Data

US 2003/0076822 A1      Apr. 24, 2003

Related U.S. Application Data

(60) Provisional application No. 60/325,249, filed on Sep. 26, 2001.

(51) Int. Cl.
H04L 12/54     (2006.01)

(52) U.S. Cl. .................................. 370/428; 370/462

(58) Field of Classification Search ............ 370/229, 370/230, 230.1, 231, 235, 419–421, 428, 370/461, 463
See application file for complete search history.

(56) References Cited

U.S. PATENT DOCUMENTS

| | | | | |
|---|---|---|---|---|
| 5,493,667 A | | 2/1996 | Huck et al. ............... | 395/452 |
| 5,802,295 A | * | 9/1998 | Fukui et al. ............... | 709/216 |
| 5,809,527 A | | 9/1998 | Cooper et al. ............. | 711/133 |
| 5,809,543 A | | 9/1998 | Byers et al. ............... | 711/162 |
| 5,963,963 A | | 10/1999 | Schmuck et al. .......... | 707/205 |
| 6,052,383 A | * | 4/2000 | Stoner et al. ............. | 370/466 |
| 6,438,655 B1 | | 8/2002 | Nicol et al. ............... | 711/136 |
| 6,601,143 B1 | | 7/2003 | Lamparter ................ | 711/134 |
| 6,754,223 B1 | * | 6/2004 | Lussier et al. ............. | 370/412 |
| 6,771,646 B1 | | 8/2004 | Sarkissian et al. ......... | 370/392 |
| 6,778,546 B1 | * | 8/2004 | Epps et al. ................ | 370/413 |
| 7,035,250 B2 | * | 4/2006 | Lai et al. .................. | 370/352 |

* cited by examiner

*Primary Examiner*—Wing F Chan
*Assistant Examiner*—Duc T Duong
(74) *Attorney, Agent, or Firm*—McAndrews, Held & Malloy, Ltd.

(57) ABSTRACT

An off-load engine for processing a packet conveyed between a target and a network over a transport connection, the packet including a payload and a header. The engine includes a payload buffer, for holding data exchanged between the off-load engine, the network, and the target for inclusion in the payload, and a packet processor, for processing context of the transport connection.

The engine also includes a context buffer, for holding the context processed by the packet processor, a memory access multiplexer, which is coupled to convey the data in the payload buffer and the context in the context buffer to and from a memory that stores both the data and the context, and an arbiter, which controls the multiplexer by arbitrating among payload requests to convey the data between the payload buffer and the memory and context requests to convey the context between the context buffer and the memory.

22 Claims, 3 Drawing Sheets

DATA AND CONTEXT MEMORY SHARING

CROSS-REFERENCE TO RELATED APPLICATIONS

This application claims the benefit of U.S. Provisional Patent Application No. 60/325,249, filed Sep. 26, 2001, which is incorporated herein by reference.

FIELD OF THE INVENTION

The present invention relates generally to data communications, and specifically to high speed data communications transferred as packets.

BACKGROUND OF THE INVENTION

A data receiver needs to be able to receive and process incoming packets sufficiently quickly so that there is no significant buildup, or bottleneck, at each stage of the processing. Such bottlenecks have occurred because of, for example, a relatively large number of operations required to be performed by a central processing unit (CPU). As the speed of CPUs has increased, more than compensating for these bottlenecks, the bottlenecks have moved to other places in the processing chain.

The Transport Control Protocol (TCP) is a connection based packet protocol between two endpoints. Each endpoint needs to perform a set of operations, termed TCP termination, on receiving TCP packets in order to support the protocol. Typically, until relatively recently, TCP termination operations have been performed in software, under direction of a CPU. As data transfer rates have increased such software driven terminations have become bottlenecks, and have been transferred to hardware, typically in the form of a printed circuit card or an application specific integrated circuit (ASIC). Hardware for performing the terminations is termed a TCP off-load engine (ToE).

Terminating hardware such as a ToE is typically coupled to an Ethernet network. The hardware strips off headers from incoming packets, and transfers the payload of the packets to a host system. The payload is stored in a first, data, memory until the host system accepts it, or until missing packets have been received by the ToE, so that the ToE can send the data to the host in the original transmitted order. The size of the data memory needed is proportional to the product of the network rate and the network round trip delay (since all incoming data has to be acknowledged), leading to the need for large, of the order of hundreds of megabits, memories. Such memories are not practical for current ASIC technologies. In addition to requiring large memory size, memories for terminating hardware need fast access rates, since received data has to be written into, then read from, the memory at the network rate. If the memory is also used for temporarily storing transmitted data, the latter also has to be written into, then read from, the memory. The memory thus needs an access rate of the order of four times the network rate.

The headers comprise Ethernet, Internet Protocol (IP), and TCP layers, as well as optional higher layers such as an Internet Small Computer System Interface (iSCSI) layer. A second, context, memory acts as a database of connections maintained by the host system, the database comprising parameters for the state of each connection. The context memory, for example, maintains the last sequence number of received TCP segments. Other layers, such as the iSCSI layer, require the context memory to maintain parameters relevant to these connections.

For a system having relatively few connections, the context memory may be implemented within an ASIC as an on-chip memory. When larger numbers of connections need to be supported, the context memory may require use of an external memory. When external memory is used, the access rate to the external memory becomes an important consideration. The access rate is linearly dependent on the incoming packet or segment rate, and this is variable. For example, if a large numbers of short packets are received, the incoming packet rate, and hence the external memory access rate, is high. In order to implement such high access rates, very large numbers of data bus pins must be used, and such large numbers may be difficult to implement. Thus, an efficient hardware implementation of a ToE requires high access rates both for context and data memories, and such an implementation may be costly and may not even be practical for the high efficiencies required.

SUMMARY OF THE INVENTION

The present invention seeks to provide more efficient utilization of memory by a packet off-load engine, by using a single memory as both a context information and a payload data memory. Since context access and payload access rates are approximately inversely proportional, the single memory enables high access rates for both context and payload access, and such a single memory may be implemented in practice.

In preferred embodiments of the present invention, a packet off-load engine acts as an interface between a data network, a target, and a single memory external to the engine. The single memory stores payload data and context information of data packets transmitted between the network and the target. The off-load engine comprises an arbiter which arbitrates between write-payload, read-payload, write-context, and read-context requests to the memory, herein termed read-write memory requests. The arbiter comprises a context/payload memory access multiplexer, the multiplexer being able to transfer context information or payload data between the single memory and the engine. The multiplexer transfers the context information or the payload data according to a specific read-write request which the arbiter, after performing its arbitration, conveys to the memory.

The off-load engine is most preferably configured to have a receiver section which processes data packets received from the network for the target, and a transmission section which constructs data packets for transmission to the network from the target. The receiver section terminates a packet received from the network by stripping the header from the packet, and writing the packet's payload data to the memory, via the arbiter. Parameters in the stripped-off header are compared with context information, read from the memory via the arbiter, so that a correct disposition of the payload to the target may be implemented, and so that the context information may be updated as necessary and written to the memory.

The transmission section generates a packet to be transmitted to the network, for a payload received from the target, by reading context information from the memory via the arbiter. The transmission section generates a header based on the context information and on the payload, and appends the header to the payload to form the packet to be transmitted. After transmission of the packet, the transmission section writes an updated context to the memory via the arbiter.

By arbitrating between read and write, context and payload, transfers (four operations), preferred embodiments of the present invention provide an efficient system for performing such transfers between a single external memory and the off-load engine. The efficiency is a result of the approximately inverse relationship between the bandwidth requirements of context transfer and payload transfer—packets with small payloads requiring relatively higher rates of context transfer and relatively lower rates of payload transfer, compared with packets with large payloads that require relatively lower rates of context transfer and relatively higher rates of payload transfer. Furthermore, when the off-load engine is implemented as an integrated circuit device, the number of pins needed by the device can be significantly reduced, relative to devices known in the art, since the device need be coupled to only a single external memory using a single address bus, rather than to separate context and payload memories having separate address busses.

There is therefore provided, according to a preferred embodiment of the present invention, an off-load engine for processing a data packet conveyed between a target device and a network over a transport connection, the data packet including a payload and a header, the engine including:
 a payload buffer, for holding data that is exchanged between the off-load engine, the network, and the target device for inclusion in the payload;
 a packet processor, for processing context information with respect to the transport connection;
 a context buffer, for holding the context information that is processed by the packet processor;
 a memory access multiplexer, which is coupled to convey the data in the payload buffer and the context information in the context buffer to and from a single memory that stores both the data and the context information; and
 an arbiter, which is adapted to control the multiplexer by arbitrating among payload requests to convey the data between the payload buffer and the single memory and context requests to convey the context information between the context buffer and the single memory.

Preferably, at least one of the payload buffer, the packet processor, and the context buffer, generate at least one of the payload requests and the context requests responsive to receiving the data.

Preferably, the payload requests include a write-payload-to and a read-payload-from request to the single memory, and wherein the context requests include a write-context-to and a read-context-from request to the single memory.

Preferably, the packet processor controls operation of at least one of the payload buffer, the context buffer, the multiplexer, and the arbiter.

Preferably, the packet processor receives the data packet from the network, strips the header from the data packet so as to provide the data for holding in the payload buffer, and routes the payload to the target device responsive to the context information. Further preferably, the packet processor receives the payload from the target device, generates the header responsive to the context information, appends the header to the payload to form the data packet, and transmits the data packet to the network.

Preferably, the payload buffer includes at least one receiver payload buffer for holding the data responsive to receiving the data packet from the network and at least one transmitter payload buffer for holding the data responsive to transmitting the data packet to the network, the packet processor includes at least one receiver packet processor for processing the header together with the context information responsive to receiving the data packet from the network so as to generate processed received context, and at least one transmitter packet processor for processing the header together with the context information responsive to transmitting the data packet to the network so as to generate processed transmitted context, and the context buffer includes a receiver context buffer for holding the processed received context and a transmitter context buffer for holding the processed transmitted context.

Preferably, the single memory includes a plurality of separate memories, at least one of the plurality of separate memories being external to the engine, and at least one of the plurality of separate memories being included within the engine.

There is further provided, according to a preferred embodiment of the present invention, a method for processing in an off-load engine a data packet conveyed between a target device and a network over a transport connection, the data packet including a payload and a header, including:
 holding, in a payload buffer, data that is exchanged between the off-load engine, the network, and the target device for inclusion in the payload;
 processing context information with respect to the transport connection;;
 holding, in a context buffer, the context information;
 performing an arbitration, among payload requests to convey the data between the payload buffer and a single memory that stores both the data and the context information, and context requests to convey the context information between the context buffer and the single memory; and
 conveying the data in the payload buffer and the context information in the context buffer to and from the single memory responsive to the arbitration.

The method preferably includes at least one of the payload buffer, the packet processor, and the context buffer, generating at least one of the payload requests and the context requests responsive to receiving the data.

Preferably, the payload requests include a write-payload-to and a read-payload-from request to the single memory, and wherein the context requests include a write-context-to and a read-context-from request to the single memory.

Preferably, conveying the data and the context information includes multiplexing the data and the context information.

The method preferably also includes:
 receiving the data packet from the network;
 stripping the header from the data packet so as to provide the data for holding in the payload buffer; and
 routing the payload to the target device responsive to the context information.

Preferably, the method further includes:
 receiving the payload from the target device;
 generating the header responsive to the context information;
 appending the header to the payload to form the data packet; and
 transmitting the data packet to the network.

Preferably, the payload buffer includes at least one receiver payload buffer for holding the data responsive to receiving the data packet from the network and at least one transmitter payload buffer for holding the data responsive to transmitting the data packet to the network, processing the context information includes providing at least one receiver packet processor for processing the header together with the context information responsive to receiving the data packet from the network so as to generate processed received context, and providing at least one transmitter packet processor for processing the header together with the context information responsive to transmitting the data packet to the network so as to generate processed transmitted context, and the context buffer includes a receiver context buffer for holding the processed received context and a transmitter context buffer for holding the processed transmitted context.

Preferably, the single memory includes a plurality of separate memories, at least one of the plurality of separate memories is external to the engine, and at least one of the plurality of separate memories is included within the engine.

There is further provided, according to a preferred embodiment of the present invention, a method for processing a data packet having a payload in an off-load engine, the packet being conveyed over a transport connection through a network, the method including receiving the payload;

generating, responsive to receiving the payload, at least one of a plurality of read-write requests to a memory storing the payload of the packet and context information with respect to the connection;

performing an arbitration between the plurality of read-write requests;

conveying the at least one of the read-write requests to the memory responsive to the arbitration; and transferring the payload and the context information between the memory and the off-load engine responsive to an acceptance of the at least one of the read-write requests by the memory.

There is further provided, according to a preferred embodiment of the present invention, an off-load engine for processing a data packet having a payload, which is conveyed over a transport connection through a network, the engine including:

a packet processor which is adapted, responsive to receipt of the payload by the off-load engine, to generate at least one of a plurality of read-write requests to a memory storing the payload of the packet and context information with respect to the connection; and an arbiter which is adapted to perform an arbitration between the plurality of read-write requests and, responsive to the arbitration, to convey the at least one of the read-write requests to the memory and, responsive to the memory accepting the at least one of the read-write requests, to transfer the payload and the context information between the memory and the off-load engine.

The present invention will be more fully understood from the following detailed description of the preferred embodiments thereof, taken together with the drawings, in which:

DETAILED DESCRIPTION OF PREFERRED EMBODIMENTS

Figure 1:
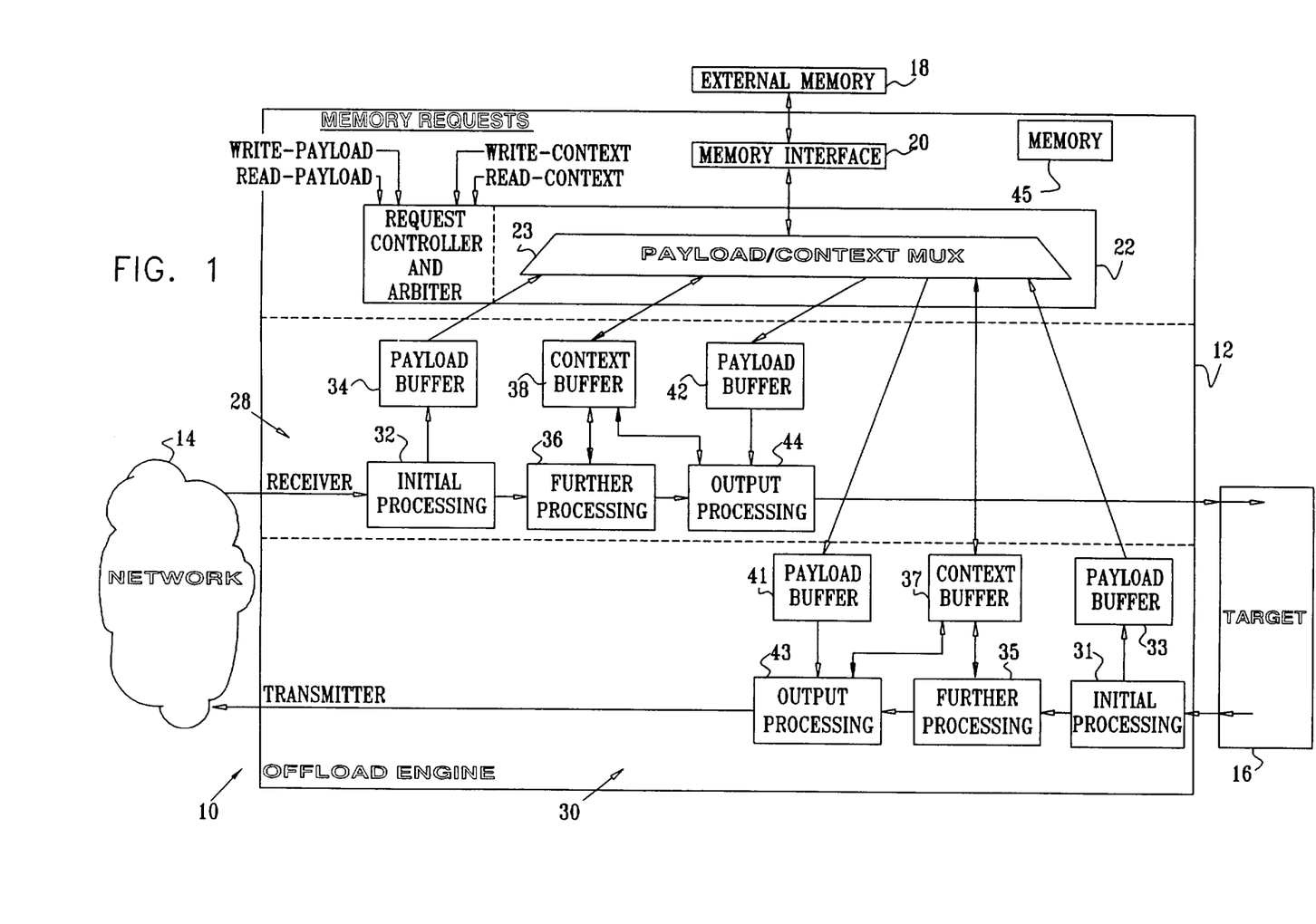
FIG. 1 is a schematic block diagram of a system illustrating an off-load engine and elements coupled to the engine, according to a preferred embodiment of the present invention.

Reference is now made to FIG. 1, which is a schematic block diagram of a system 10 illustrating an off-load engine 12 and elements coupled to the engine, according to a preferred embodiment of the present invention. A target 16 is coupled to a data network 14, and the target is able to transmit data to the network, and receive data from the network, in the form of packets. Preferably, network 14 comprises an Ethernet network, and the data transferred between target 16 and the network is in the form of Transmission Control Protocol (TCP) packets, the packets comprising a header and a payload. It will be appreciated, however, that the scope of the present invention is not limited to such TCP packets and/or Ethernet networks. Rather, the scope of the present invention comprises any packet having a payload and a header providing information as to disposition of the payload, and any network which is able to transmit and receive such packets.

Target 16 is coupled to network 14 via off-load engine 12, herein also referred to as TCP off-load engine (ToE) 12. ToE 12 acts as a network termination, and comprises a receiver section 28 and a transmitter section 30. For a packet received from the network, receiver section 28 removes a header from the packet, and conveys a payload of the packet to target 16 according to a transport connection of the packet. For a packet transmitted to the network, transmitter section 30 receives the payload of the packet from target 16, adds a header to the payload according to the connection, and transmits the packet so formed to network 14.

In order to route the payload of the received packet to its correct destination, receiver section 28 uses context information associated with the packet, initial context information being generated at connection initialization from software running in ToE 12 or in target 16. Context information for the packet comprises parameters associated with and describing a connection via which the packet is conveyed. Such parameters include, for example, a state of the connection, a flow control state, a sequence number of a last received segment/packet, and a pointer to a memory location of connection data. For each received packet, the context information is derived from the header of the packet and from previous context information for the connection which is accessed by ToE 12.

For each transmitted packet, ToE 12 generates context information for the packet from previous context information for the packet's connection and from target 16. ToE 12 uses the context information to construct a header for the payload, appends the header to the payload to form the packet, and then transmits the packet into network 14.

ToE 12 comprises a request controller and arbiter 22, herein termed arbiter 22. Arbiter 22 acts as an arbiter of read-write requests received for an external memory 18, and comprises a memory access multiplexer/demultiplexer 23 for payload data and context information transferred between the memory and ToE 12. Arbiter 22 is coupled to an external memory interface 20, receiver payload buffers 34 and 42, a receiver context buffer 38, transmitter payload buffers 33 and 41, and a transmitter context buffer 37. ToE 12 also comprises a memory 45. The functions of these elements, as well as processing blocks comprised in receiver section 28 and transmitter section 30, are described below, with reference to FIGS. 2, 3, and 4. The coupling between elements of ToE 12 is by dedicated point-to-point busses.

Figure 2:
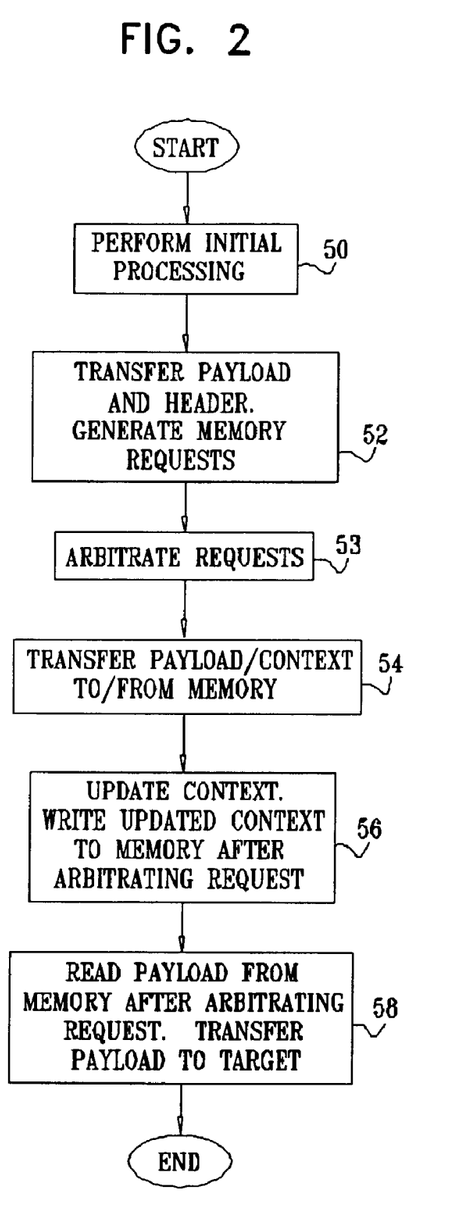
FIG. 2 is a flowchart showing steps performed by the off-load engine of FIG. 1 when a packet is received from a network, according to a preferred embodiment of the present invention.

FIG. 2 is a flowchart showing steps performed by ToE 12 when a packet is received from network 14, according to a preferred embodiment of the present invention. In a first step 50, network 14 transfers the packet to a receiver initial processing block 32. The packet is stored in block 32 while the block performs initial processing on the packet, the initial processing comprising, inter alia, checks for errors in the packet by checking a cyclic redundancy code (CRC), and/or a TCP checksum, and/or an Internet Protocol (IP) address. The initial processing also preferably includes parsing of the packet to find the boundary between the payload and the header, and removing lower layers zero padding.

In addition, processing block 32 performs an initial "search" to find a local connection value corresponding to a connection to which the packet belongs. The local connection value enables block 32 to determine which context is to be loaded. Such searches are known in the art.

In a second step 52, payload data of the packet is transferred to payload buffer 34. In step 52, read-write requests directed to external memory 18 are also sent to arbiter 22. The requests comprise a write-payload request from payload buffer 34, asking that external memory 18 receive the payload data in the buffer. A read-context request is also sent, preferably from buffer 34, asking that the external memory provide context information, for the connection on which the packet has been transmitted, to context buffer 38. Alternatively, the read-context request is sent from initial processing block 32 or further processing block 36. The header of the packet, and/or processing control, is transferred to a receiver further processing block 36.

In a third step 53, arbiter 22 arbitrates between the write-payload request and the read-context request to memory 18, and between other read-write requests to the memory described below. Arbiter 22 performs the arbitration according to pre-determined parameters such as an amount of data that will be conveyed responsive to each request, sizes of buffers used for each request, space available in the buffers, availability of the buffers, and a priority set for each request. After arbitration, arbiter 22 forwards the write-payload request and the read-context request to external memory 18.

In a fourth step 54, external memory 18 accepts the write-payload request, and the payload data is written to the external memory via multiplexer 23 and memory interface 20. Also, responsive to the read-context request, the context information for the connection is read from external memory 18 to context buffer 38 via memory interface 20 and multiplexer 23. Further processing block 36 uses the context available in buffer 38 to continue processing of the header, including, for example, performing TCP sequence number validation and out-of-order packet handling.

In a fifth step 56, further processing block 36 updates the context information and transfers the updated context information to buffer 38. Buffer 38 generates a write-context request, which is arbitrated and conveyed by arbiter 22 to external memory 18. Responsive to the write-context request, the updated context is written to external memory 18, replacing the context for the connection previously stored in the external memory. The header of the packet, and/or processing control, is transferred to a receiver output processing block 44.

In a sixth step 58, output processing block 44 generates a read-payload request, which is arbitrated and conveyed by arbiter 22 to external memory 18. Responsive to the request, the payload data is read from external memory 18 and stored in payload buffer 42. Output processing block 44 checks that target 16 is ready to accept the payload, and conveys the payload from buffer 42 according to the updated context in context buffer 38. If one or more packets have been dropped while being transmitted in network 14, step 58 is most preferably not implemented until the dropped packets have been re-transmitted by the far end of the connection, so that ToE 12 is able to convey payloads to target 16 in their correct order.

It will be appreciated that receiver processing blocks 32, 36, and 44 act as a receiver packet processor, and that the tasks performed by the blocks may be divided between the blocks in ways other than those described hereinabove, as will be understood by those skilled in the art. It will also be understood that the tasks performed by blocks 32, 36, and 44 are not limited to those described hereinabove, and that the blocks may perform other tasks, known in the art, for processing of received packets.

Figure 3:
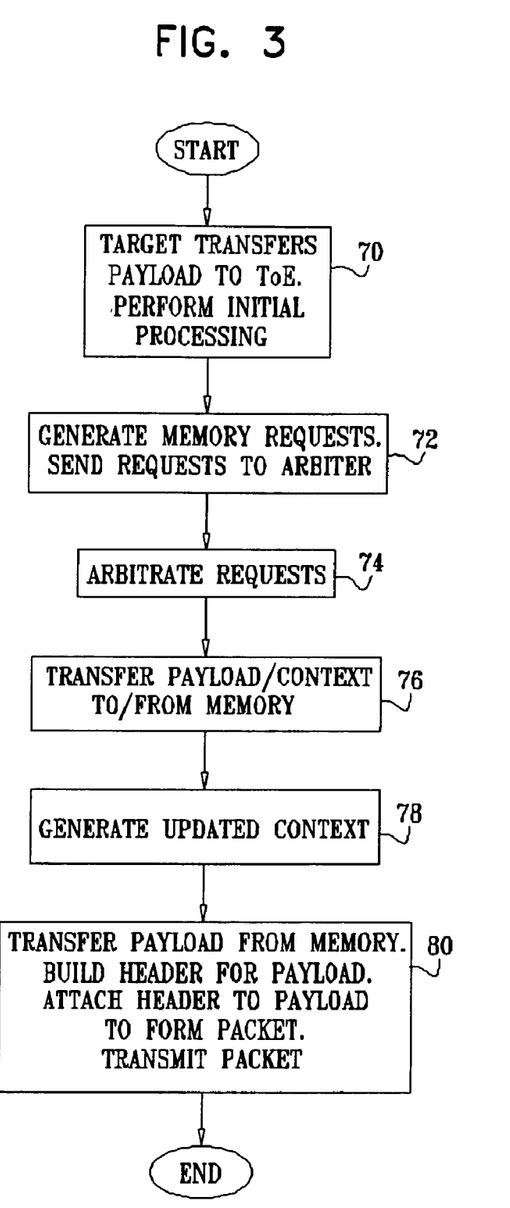
FIG. 3 is a flowchart showing steps performed by the off-load engine of FIG. 1 when a packet is transmitted into the network, according to a preferred embodiment of the present invention.

FIG. 3 is a flowchart showing steps performed by ToE 12 when a packet is transmitted into network 14 from target 16, according to a preferred embodiment of the present invention. In a first step 70, target 16 transfers a payload to be transmitted, and a header, to a transmitter initial processing block 31. Block 31 performs a preliminary analysis of the header, and passes the header, and/or control, to a transmitter further processing block 35. The preliminary analysis is generally similar, mutatis mutandis, to that performed by receiver block 32, as described above. Block 31 also transfers the payload to transmitter payload buffer 33.

In a second step 72, buffer 33 sends a write-payload request to arbiter 22, asking that external memory 18 receives payload data from the buffer. Further processing block 35 also sends a read-context request to the arbiter. The context request asks that previous context information stored in memory 18, for the connection on which the payload is to be sent, is written to context buffer 37.

In a third step 74, arbiter 22 arbitrates between the write-payload request and the read-context request and between other requests. After arbitration, arbiter 22 forwards the write-payload request and the read-context request to external memory 18.

In a fourth step 76, external memory 18 accepts the write-payload request, and the payload data is written to the external memory via multiplexer 23 and memory interface 20. Also, responsive to the read-context request, the context information for the connection is read from external memory 18 to context buffer 37 via memory interface 20 and multiplexer 23.

In a fifth step 78, further processing block 35 updates the context information in buffer 37. The updated context information is generated from the context information already in buffer 37 and from header information supplied by initial processing block 31. The updated context information is written to context buffer 37, replacing the previous context information stored therein. Substantially as described above with reference to step 56 (FIG. 2), the updated context is then stored in external memory 18. Further processing block 35 also performs processes such as managing flow control towards the network and processing flow control messages from receiver section 28. The header of the packet, and/or processing control, is transferred to a transmitter output processing block 43.

In a sixth step 80, output processing block 43 generates a read-payload request, which is arbitrated and conveyed by arbiter 22 to external memory 18. Responsive to the request, the payload data is read from external memory 18 and stored in payload buffer 41. Block 43 forms a header responsive to the context information in buffer 37 and to the header passed from block 35. Block 43 attaches the header it forms to the payload in buffer 41 to form a packet, and transmits the packet to network 14. As for step 58, (FIG. 2), a transmitted packet may not be automatically transmitted on receipt of data from target 16. For example, transmission of the packet may be delayed until a remote receiver has indicated its readiness to receive the transmission.

It will be appreciated that transmitter processing blocks 31, 35, and 43 act as a transmitter packet processor, and that the tasks performed by the blocks may be divided between the blocks in ways other than those described hereinabove, as will be understood by those skilled in the art. It will also be understood that the tasks performed by blocks 31, 35, and 43 are not limited to those described hereinabove, and that the blocks may perform other tasks, known in the art, for processing of transmitted packets.

It will be appreciated that both for transmission and receiving of packets, writing to external memory 18 and reading from the external memory are, although related, not directly synchronized.

Figure 4:
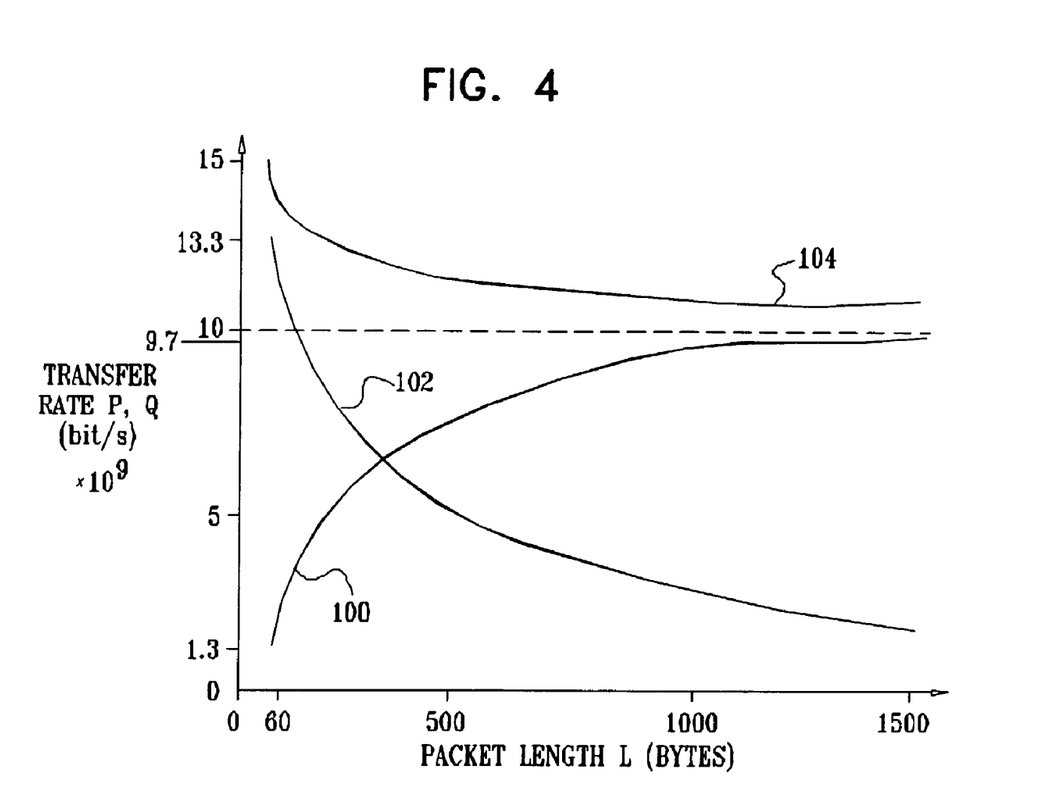
FIG. 4 shows schematic graphs of transfer rates of data vs. packet length, according to a preferred embodiment of the present invention.

FIG. 4 shows schematic graphs of required transfer rates of data vs. packet length, according to a preferred embodiment of the present invention. The graph ordinate is the required bandwidth in bits/s; the graph abscissa is the length of a packet in bytes. The graphs of FIG. 4 are representative of rates of transfer of data to one or more memories used to store payload and context of packets. A graph 100 shows required bandwidth if only payload is transferred to the memories. A graph 102 shows required bandwidth if only context is transferred to the memories. A graph 104 is the sum of graphs 100 and 102.

The graphs show values assuming that a line bandwidth, B, for writing to the memories is 10 Gbit/s, a packet may have a length L from 60 bytes to 1500 bytes, a header length, H, of each packet is 50 bytes, and a context transferred, C, for each packet is 80 bytes.

It will be understood that the graphs of FIG. 4 are by way of example, as are the values of B, L, H, and C.

A required bandwidth, P, for payload transfer, i.e., no header is written, is given by the expression:

$$P = B \cdot \frac{L-H}{L} \quad (1)$$

Graph 100 plots equation (1). As is shown in the graph, the maximum value of P, 9.7 Gb/s, occurs for L=1500, corresponding to the case when all packets received have the largest possible packet length. The minimum value of P, for L=60, is 1.3 Gb/s.

A required bandwidth Q for context transfer to the memory is given by the expression:

$$Q = B \cdot \frac{C}{L} \quad (2)$$

(Equations (1) and (2) assume the whole bandwidth B is filled by packets of length L, giving a packet rate $$\frac{B}{L}.$$

Graph 102 plots equation (2). As is shown in the graph, the maximum value of Q, 13.3 Gb/s, occurs for L=60, i.e., the smallest possible packet length. The minimum value of Q, when L=1500 bytes, is 0.5 Gb/s.

Graph 104 corresponds to a sum of graphs 102 and 104, and corresponds to the required transfer rate if a single memory is used. Graph 104 has a largest value of 13.3+ 1.3=14.6 Gb/s (for L=60 bytes).

It will be understood that if two separate memories, a first for context and a second for payload had been used, a required total rate of transfer to the memories is 9.7+13.3=23 Gb/s. Thus, transferring to a single memory generates considerable savings of bandwidth.

It will thus be appreciated that multiplexing the context information and payload data is an efficient method for transferring context and payload between the ToE 12 and memory 18. Furthermore, an overall efficiency of operation of ToE 12 may be further increased by altering priorities for the different types of read-write memory transfers (write-payload, read-payload, write-context, read-context) according to demand, such as by incorporating an adaptive system into arbiter 22 and/or by enabling the priorities to be set externally. It will also be understood that bandwidth is saved since headers are not written to memory 18.

In some preferred embodiment of the present invention, at least a part of the context information may be written to memory 45, so that the context is available within the off-load engine. It will be understood that respective parts of the context stored in memory 45 may be a selected part of the context for all the connections, or specific to respective connections on which packets are transmitted. Also, memory 45 may be implemented as one or more memory instances in ToE 12. It will also be understood that external memory 18 may comprise more than one separate memory, each containing payload and context information. For example, a data packet receiver may have a first memory, and a data packet transmitter may have a second memory.

Furthermore, by using a single external memory, such as memory 18, for storing both payload data and context information, off-load engine 12 is able to reduce numbers of pins required for connecting the memory and the engine, compared to off-load engines which use separate memories for storing context and payload, since only a single address bus is required.

It will be understood that the scope of the present invention may be applied for substantially any data packet having a header comprising information for disposition of a payload comprised in the packet. Such packets include, but are not limited to, Transport Control Protocol (TCP), Internet protocol (IP), and Internet Small Computer System Interface (iSCSI) packets.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An off-load engine for processing a data packet conveyed between a target device and a network over a transport connection, the data packet including a payload and a header, the engine comprising:
   a payload buffer, for holding data that is exchanged between the off-load engine, the network, and the target device for inclusion in the payload;
   a packet processor, for processing context information with respect to the transport connection;
   a context buffer, for holding the context information that is processed by the packet processor;
   a memory access multiplexer, which is coupled to convey the data in the payload buffer and the context information in the context buffer to and from a single memory that stores both the data and the context information; and
   an arbiter, which is adapted to control the multiplexer by arbitrating among payload requests to convey the data between the payload buffer and the single memory and context requests to convey the context information between the context buffer and the single memory.

2. The off-load engine according to claim 1, wherein at least one of the payload buffer, the packet processor, and the context buffer, generate at least one of the payload requests and the context requests responsive to receiving the data.

3. The off-load engine according to claim 1, wherein the payload requests comprise a write-payload-to and a read-payload-from request to the single memory, and wherein the context requests comprise a write-context-to and a read-context-from request to the single memory.

4. The off-load engine according to claim 1, wherein the packet processor controls operation of at least one of the payload buffer, the context buffer, the multiplexer, and the arbiter.

5. The off-load engine according to claim 1, wherein the packet processor receives the data packet from the network, strips the header from the data packet so as to provide the data for holding in the payload buffer, and routes the payload to the target device responsive to the context information.

6. The off-load engine according to claim 1, wherein the packet processor receives the payload from the target device, generates the header responsive to the context information, appends the header to the payload to form the data packet, and transmits the data packet to the network.

7. The off-load engine according to claim 1, wherein the payload buffer comprises at least one receiver payload buffer for holding the data responsive to receiving the data packet from the network and at least one transmitter payload buffer for holding the data responsive to transmitting the data packet to the network, wherein the packet processor comprises at least one receiver packet processor for processing the header together with the context information responsive to receiving the data packet from the network so as to generate processed received context, and at least one transmitter packet processor for processing the header together with the context information responsive to transmitting the data packet to the network so as to generate processed transmitted context, and wherein the context buffer comprises a receiver context buffer for holding the processed received context and a transmitter context buffer for holding the processed transmitted context.

8. The off-load engine according to claim 1, wherein the single memory comprises a plurality of separate memories.

9. The off-load engine according to claim 8, wherein at least one of the plurality of separate memories is external to the engine.

10. The off-load engine according to claim 8, wherein at least one of the plurality of separate memories is comprised within the engine.

11. A method for processing in an off-load engine a data packet conveyed between a target device and a network over a transport connection, the data packet including a payload and a header, comprising:

holding, in a payload buffer, data that is exchanged between the off-load engine, the network, and the target device for inclusion in the payload;

processing context information with respect to the transport connection;

holding, in a context buffer, the context information;

performing an arbitration, among payload requests to convey the data between the payload buffer and a single memory that stores both the data and the context information, and context requests to convey the context information between the context buffer and the single memory; and conveying the data in the payload buffer and the context information in the context buffer to and from the single memory responsive to the arbitration.

12. The method according to claim 11, comprising generating, by at least one of the payload buffer, the packet processor, and the context buffer, at least one of the payload requests and the context requests responsive to receiving the data.

13. The method according to claim 11, wherein the payload requests comprise a write-payload-to and a read-payload-from request to the single memory, and wherein the context requests comprise a write-context-to and a read-context-from request to the single memory.

14. The method according to claim 11, wherein conveying the data and the context information comprises multiplexing the data and the context information.

15. The method according to claim 11, comprising:
receiving the data packet from the network;
stripping the header from the data packet so as to provide the data for holding in the payload buffer; and
routing the payload to the target device responsive to the context information.

16. The method according to claim 11, comprising:
receiving the payload from the target device;
generating the header responsive to the context information;
appending the header to the payload to form the data packet; and
transmitting the data packet to the network.

17. The method according to claim 11, wherein the payload buffer comprises at least one receiver payload buffer for holding the data responsive to receiving the data packet from the network and at least one transmitter payload buffer for holding the data responsive to transmitting the data packet to the network, wherein processing the context information comprises providing at least one receiver packet processor for processing the header together with the context information responsive to receiving the data packet from the network so as to generate processed received context, and providing at least one transmitter packet processor for processing the header together with the context information responsive to transmitting the data packet to the network so as to generate processed transmitted context, and wherein the context buffer comprises a receiver context buffer for holding the processed received context and a transmitter context buffer for holding the processed transmitted context.

18. The method according to claim 11, wherein the single memory comprises a plurality of separate memories.

19. The method according to claim 18, wherein at least one of the plurality of separate memories is external to the engine.

20. The method according to claim 18, wherein at least one of the plurality of separate memories is comprised within the engine.

21. A method for processing a data packet having a payload in an off-load engine, the packet being conveyed over a transport connection through a network, the method comprising:

receiving the payload;

generating, responsive to receiving the payload, at least one of a plurality of read-write requests to a memory storing the payload of the packet and context information with respect to the connection;

performing an arbitration between the plurality of read-write requests;

conveying the at least one of the read-write requests to the memory responsive to the arbitration; and transferring the payload and the context information between the memory and the off-load engine responsive to an acceptance of the at least one of the read-write requests by the memory.

22. An off-load engine for processing a data packet having a payload, which is conveyed over a transport connection through a network, the engine comprising:

a packet processor which is adapted, responsive to receipt of the payload by the off-load engine, to generate at least one of a plurality of read-write requests to a memory storing the payload of the packet and context information with respect to the connection; and an arbiter which is adapted to perform an arbitration between the plurality of read-write requests and, responsive to the arbitration, to convey the at least one of the read-write requests to the memory and, responsive to the memory accepting the at least one of the read-write requests, to transfer the payload and the context information between the memory and the off-load engine.

\* \* \* \* \*